(12) United States Patent
Hoffmann

(10) Patent No.: US 12,451,805 B2
(45) Date of Patent: Oct. 21, 2025

(54) FEEDBACK CURRENT DEPENDED RAMP GENERATOR FOR SWITCHED MODE POWER SUPPLY

(71) Applicant: GlobalFoundries U.S. Inc., Malta, NY (US)

(72) Inventor: Matthias Hoffmann, Dresden (DE)

(73) Assignee: GlobalFoundries U.S. Inc., Malta, NY (US)

( * ) Notice: Subject to any disclaimer, the term of this patent is extended or adjusted under 35 U.S.C. 154(b) by 222 days.

(21) Appl. No.: 18/351,059

(22) Filed: Jul. 12, 2023

(65) Prior Publication Data

US 2025/0023468 A1 Jan. 16, 2025

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC ............................ H02M 3/158; H02M 1/0009
See application file for complete search history.

(56) References Cited

U.S. PATENT DOCUMENTS

| | | | |
|---|---|---|---|
| 7,135,841 B1 * | 11/2006 | Tomiyoshi | H02M 3/156 323/224 |
| 7,898,825 B2 | 3/2011 | Mulligan et al. | |
| 9,735,674 B2 | 8/2017 | Zarkhin | |
| 10,511,226 B1 | 12/2019 | Gurlahosur et al. | |
| 2012/0105030 A1 * | 5/2012 | Chen | H02M 3/156 323/271 |
| 2012/0119718 A1 | 5/2012 | Song | |
| 2018/0337599 A1 * | 11/2018 | Chen | H02M 3/158 |
| 2019/0305566 A1 * | 10/2019 | Hsu | H02M 3/158 |
| 2022/0407417 A1 * | 12/2022 | Flaibani | H02M 3/158 |
| 2023/0238883 A1 * | 7/2023 | Hsieh | H02M 3/158 323/282 |

FOREIGN PATENT DOCUMENTS

CN 112803770 A 5/2021

OTHER PUBLICATIONS

EP Search Report for related application No. 24151503.0 mailed Jul. 9, 2024.

(Continued)

*Primary Examiner* — Rafael O De Leon Domenech

(57) ABSTRACT

To reduce sub-harmonic oscillations in a Switched-Mode Power Supply (SMPS). a ramp generator circuit of the SMPS produces a ramp signal having an amplitude corresponding to a sensed current through an energy storage device, such as an inductor, of the SMPS. The ramp signal is used to control a duty cycle of the SMPS. The ramp generator circuit may include a reference current circuit, a ramp capacitor, and a discharge circuit to periodically discharge the ramp capacitor. The ramp capacitor may be charged using a charging current produced by combining a feedback current corresponding to the sensed current with a reference current produced by the reference current circuit and may be periodically discharged at a fixed frequency, or may be charged using the reference current and discharged at a time determined according to the feedback current.

15 Claims, 6 Drawing Sheets

(56) References Cited

OTHER PUBLICATIONS

Cheung Fai Lee et al. "A monolithic current-mode CMOS DC-DC converter with on-chip current-sensing technique", IEEE Journal of Solid-State Circuits, Jan. 2004, vol. 39, No. 1, pp. 3-14, doi: 10.1109/JSSC.2003.820870.
Chi Yat Leung et al. "An integrated CMOS current-sensing circuit for low-Voltage current-mode buck regulator", IEEE Transactions on Circuits and Systems II: Express Briefs, Jul. 2005, vol. 52, No. 7, p. 394-397, doi: 10.1109/TCSII.2005.850403.
Hongyi Wang et al. "An On-Chip High-Speed Current Sensor Applied in the Current-Mode DC-DC Converter", in IEEE Transactions on Power Electronics, Sep. 2014, vol. 29, No. 9, pp. 4479-4484, doi: 10.1109/TPEL.2014.2302318.
Jia-Ming Liu et al. "A Current-Mode DC-DC Buck Converter with Efficiency-Optimized Frequency Control and Reconfigurable Compensation", IEEE Transactions on Power Electronics, Feb. 2012, vol. 27, No. 2, pp. 869-880, doi: 10.1109/TPEL.2011.2162079.
Zhuochao Sun et al. "A novel ripple controlled modulation for high efficiency DC-DC converters", 2011 International Symposium on Integrated Circuits, 2011, pp. 238-241, Singapore, doi: 10.1109/ISICir.2011.6131940.

\* cited by examiner

FIG. 3
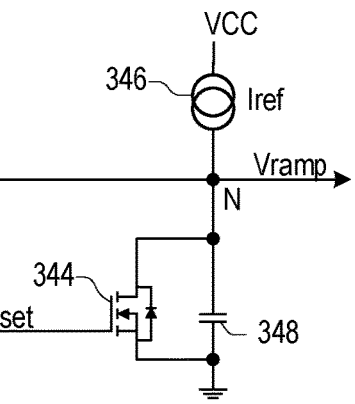
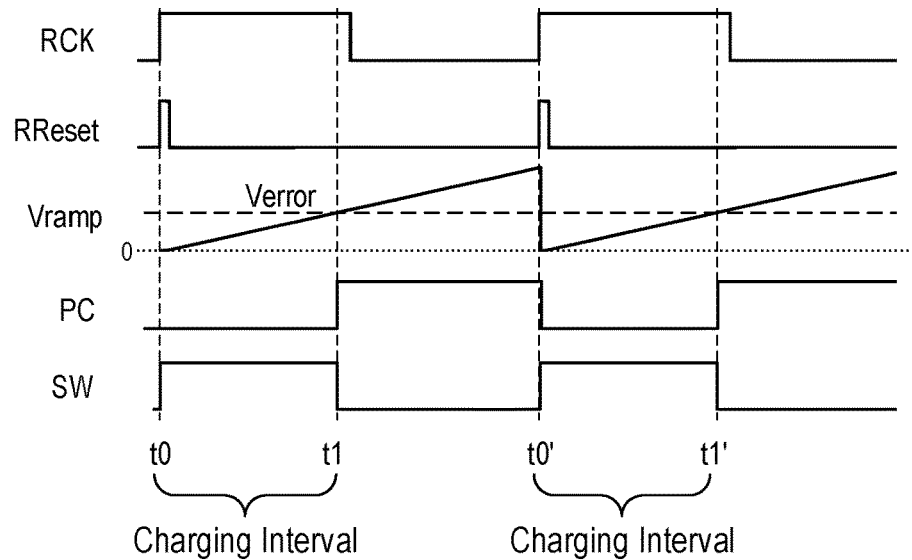
FIG. 4A
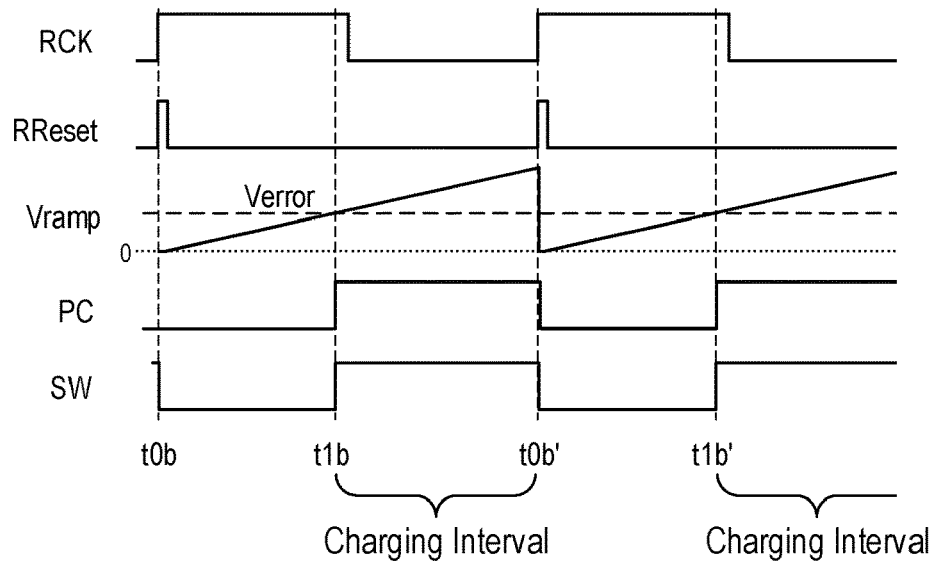
FIG. 4B

FEEDBACK CURRENT DEPENDED RAMP GENERATOR FOR SWITCHED MODE POWER SUPPLY

FIELD OF THE DISCLOSURE

The present disclosure relates to switched-mode power supplies (SMPSs), and in particular to circuits and processes for preventing subharmonic oscillation in an SMPS.

BACKGROUND

An SMPS may be subject to sub-harmonic oscillations that cause noise on the output of the SMPS. When a current through an energy-storing device in the SMPS (such as an inductor) is less than a peak current, the sub-harmonic oscillations may be reduced by controlling the switching in the SMPS according to a sensed current in the energy-storing device.

A need exists for reducing the complexity of the circuits and processes used to prevent sub-harmonic oscillations in an SMPS.

SUMMARY

Embodiments of the present disclosure relate to preventing sub-harmonic oscillation in an SMPS, and in particular to preventing sub-harmonic oscillation by controlling the rate of change, a frequency, or both of a ramp signal according to a feedback current that mirrors a current through an energy-storage device and determining a duty cycle of the SMPS by comparing the ramp signal to an error signal corresponding to an error voltage in an output voltage of the SMPS.

In an embodiment, a switched-mode power supply (SMPS) comprises an energy storage device, a current sense circuit configured to produce a feedback current according to a current flowing through the energy storage device, and a ramp generator circuit configured to produce a ramp signal according to the feedback current. The SMPS determines a duty cycle of the current flowing through the energy storage device using the ramp signal, so that an increase in a magnitude of the feedback current causes a decrease in the duty cycle, and a decrease in the magnitude of the feedback current causes an increase in the duty cycle.

In another embodiment, a method of controlling an SMPS comprises producing a feedback current corresponding to a current flowing through an energy storage device of the SMPS, producing a ramp signal having a slope, a frequency, or both corresponding to the feedback current, and controlling a duty cycle of a power switch using the ramp signal. A power source of the SMPS provides a current to the energy storage device and to a load connected to an output of the SMPS when the power switch is on, and the energy storage device provides the current to the load when the power switch is off.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 3 illustrates a ramp generator circuit according to an embodiment.

FIGS. 4A and 4B each include waveforms illustrating operation of the ramp generator of FIG. 3 in respective embodiments of the SMPS of FIG. 2.

DETAILED DESCRIPTION

Figure 1:
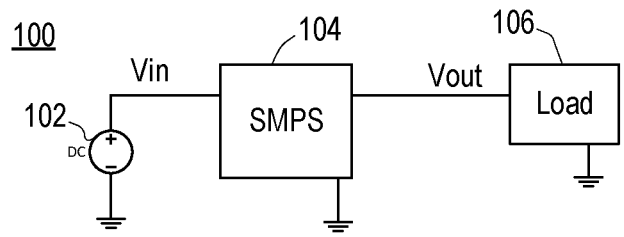
FIG. 1 illustrates a circuit according to an embodiment.

Exemplary embodiments of the present disclosure will be described below in more detail with reference to the accompanying drawings. The inventive features may, however, be embodied in different forms and should not be construed as limited to the embodiments set forth herein. Rather, these embodiments are provided so that this disclosure will be thorough and complete, and will fully convey the scope of the present claims to those skilled in the art. Throughout the disclosure, like reference numerals refer to like parts throughout the various figures and embodiments.

It will be understood that, although the terms "first" and/or "second" may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

The drawings are not necessarily to scale and in some instances, proportions may have been exaggerated in order to clearly illustrate features of the embodiments.

FIG. 1 illustrates a circuit 100 according to an embodiment. The circuit 100 includes a power source 102, am SMPS circuit 104, and a load 106.

The power source 102 supplies a direct current (DC) input voltage Vin to the SMPS circuit 104. The power source 102 may include a primary or secondary battery, an Alternating Current (AC) to DC conversion circuit, a power factor correction (PFC) circuit, or combinations thereof.

The SMPS 104 uses the input voltage Vin to produce an output voltage Vout, which is provided to the load 106. The SMPS 104 produces the output voltage Vout by switching an input current derived from the input voltage Vin on and off.

The SMPS 104 may switch the input current on and off using Pulse Width Modulation (PWM), Pulse Frequency Modulation (PFM), or combinations thereof. In embodiments, the SMPS 104 may include a fixed frequency PWM circuit wherein pulses occur at a fixed frequency but have varying durations (widths, that is, duty cycles). In another embodiment, the SMPS 104 may include a variable frequency PWM circuit wherein both the frequency and durations of the pulses vary.

Feedback loops including those caused by parasitic inductances and capacitances may cause unwanted oscillations in the output voltage Vout. These unwanted oscillations may occur at frequencies less than the frequency at which the SMPS 104 switches the input current and may therefore be referred to as sub-harmonic oscillations.

The SMPS 104 is configured to reduce or eliminate sub-harmonic oscillations, as described below.

Figure 2:
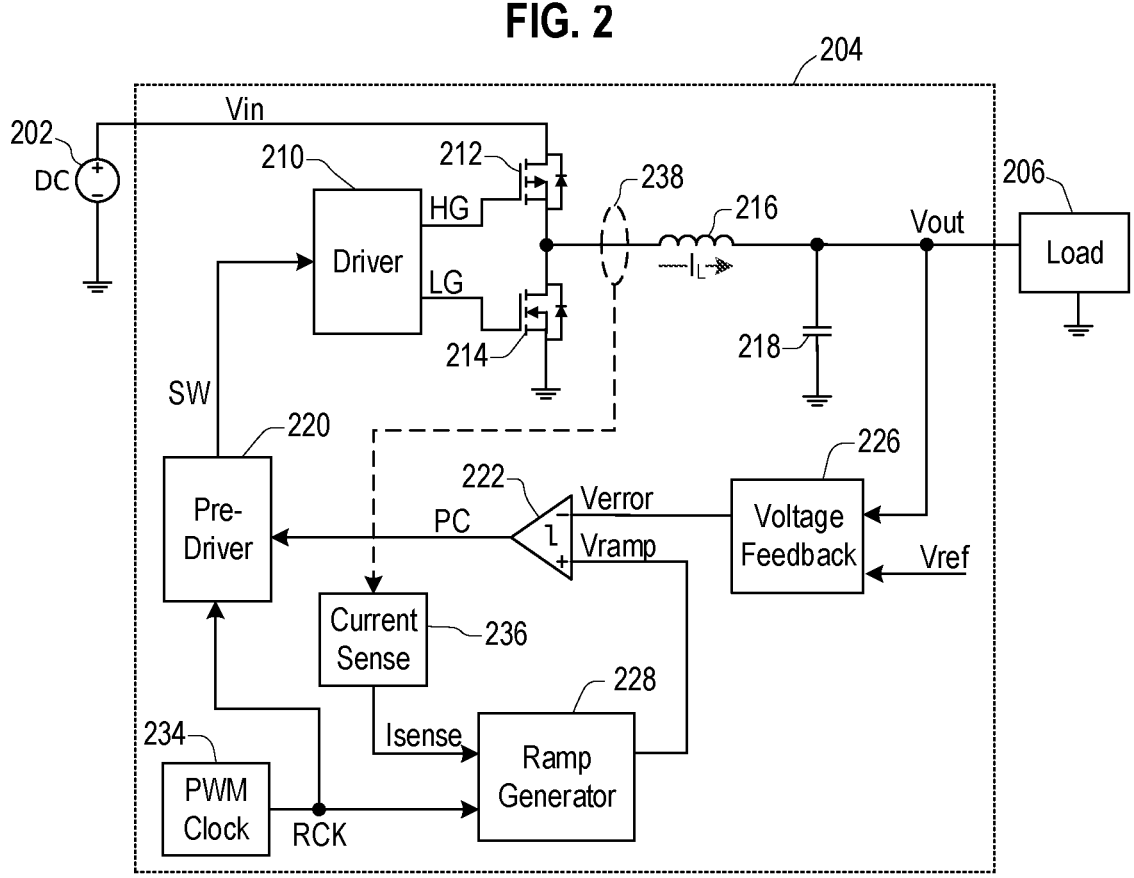
FIG. 2 illustrates an SMPS according to an embodiment.

FIG. 2 illustrates an SMPS 204 according to an embodiment. The SMPS 204 receives an input voltage Vin from a power source 202 and provides an output voltage Vout to a load 206. The power source 202, SMPS 204, and load 206 may respectively correspond to the power source 102, SMPS 104, and load 106 of FIG. 1. The SMPS 204 shown in FIG. 2 is a buck converter, but embodiments are not limited thereto.

The SMPS 204 includes a driver circuit 210, two power switches (a high switch 212 and a low switch 214), an energy storage device in the form of inductor 216, a capacitor 218, a Pulse Width Modulation (PWM) control circuit (comprising a pre-driver circuit 220 and a first comparator 222), a voltage feedback circuit 226, a ramp generator 228, a Pulse Width Modulation (PWM) clock circuit 234, a current sense circuit 236, and a current sensor 238.

The SMPS 204 operates according to the PWM clock RCK produced by the PWM clock circuit 234. The PWM clock circuit 234 may produce the PWM clock RCK having a fixed frequency, but embodiments are not limited thereto. In embodiments, the frequency of the PWM clock RCK may be between 100 KHz and 100 MHz, but embodiments are not limited thereto.

The driver circuit 210 produces a high gate signal HG and a low gate signal LG according to a PWM signal PWM. The driver circuit 210 may assert the high gate signal HG in response to an assertion of the PWM signal PWM, and de-assert the high gate signal HG in response to a de-assertion of the PWM signal PWM. The driver circuit 210 may assert the low gate signal LG in response to the de-assertion of the PWM signal PWM, and de-assert the low gate signal LG in response to the assertion of the PWM signal PWM. The driver circuit 210 may introduce a delay (referred to as a dead time) in the assertion of the high gate signal HG and in the assertion of the low gate signal LG to ensure that the switch that each signal drives is turned completely off before the switch the other signal drives is turned on. Implementation details of a variety of different instantiations of the driver circuit 210 are widely known to those of ordinary skill in the art, and are omitted in the interest of brevity The high switch 212 is turned on in response to the assertion of the high gate signal HG, and turned off in response to the de-assertion of the high gate signal HG. When the high switch 212 is on, current may flow from the input voltage Vin through the inductor 216 and to the load 206, storing energy in the inductor 216. The high switch 212 in FIG. 2 is shown as an p-channel Metal Oxide Semiconductor Field Effect Transistor (pMOSFET) but embodiments are not limited thereto.

The low switch 214 is turned on in response to the assertion of the low gate signal LG, and turned off in response to the de-assertion of the low gate signal LG. When the low switch 214 is on, current produced using the energy stored in the inductor 216 may flow to the load 206. The low switch 214 in FIG. 2 is shown as an n-channel Metal Oxide Semiconductor Field Effect Transistor (nMOSFET) but embodiments are not limited thereto.

The capacitor 218 operates to reduce the fluctuations in the output voltage Vout.

The voltage feedback circuit 226 produces an error signal Verror having a magnitude determined according to the output voltage Vout and a reference voltage Vref. A voltage value of the error signal Verror corresponds to a difference between the output voltage Vout and a desired output voltage corresponding to the reference voltage Vref. Implementation details of a variety of different instantiations of the voltage feedback circuit 226 are widely known to those of ordinary skill in the art, and are omitted in the interest of brevity.

In embodiments illustrated herein, the voltage feedback circuit 226 produces the error signal Verror by dividing the output voltage Vout by a predetermined scaling factor S and then subtracting the result of the division from the reference voltage Vref so that $$Verror = Vref - (Vout/S). \qquad \text{Equation 1A}$$

As a result, increase and decreases in the error signal Verror respectively correspond to decreases and increases in the output voltage Vout. However, embodiments are not limited to this process of generating the error signal Verror.

The first comparator 222 compares the error signal Verror to a ramp signal Vramp produced by the ramp generator 228 to produce a phase control signal PC. The first comparator 222 asserts the phase control signal PC when the ramp signal Vramp is greater than the error signal Verror, and de-asserts the phase control signal PC otherwise.

The pre-driver circuit 220 produces the PWM signal SW according to the PWM clock RCK and the phase control signal PC. As will be described below with reference to FIGS. 4A and 4B, in some embodiments, the pre-driver circuit 220 may produce the PWM signal SW by asserting the PWM signal SW in response to an assertion of the PWM clock RCK and de-asserting the PWM signal SW in response to an assertion of the phase control signal PC, while in other embodiments, the pre-driver circuit 220 may produce the PWM signal SW by asserting the PWM signal SW in response to the assertion of the phase control signal PC and de-asserting the PWM signal SW in response to the assertion of the PWM clock RCK. However, embodiments are not limited thereto. Implementation details of a variety of different instantiations of the pre-driver circuit 220 are widely known to those of ordinary skill in the art, and are omitted in the interest of brevity.

The current sense circuit 236 produces a feedback current Isense proportional to a magnitude of an inductor current $I_L$ flowing in the inductor 216 as sensed via the current sensor 238. For example, in an illustrative embodiment wherein the inductor current $I_L$ has magnitudes ranging from 0 and 500 milliamps, the magnitude of the feedback current Isense may range from 0 and 2.5 microamps.

The current sense circuit 236 may produce the feedback current Isense using a current mirror that receives the output of the current sensor 238. The current sensor 238 produces an output having a current proportional to the inductor current $I_L$.

Although the ramp generator 228 according to an embodiment performs an integration function on the feedback current Isense, as is expressed in Equation 3B, below, in some embodiments, the current sense circuit 236 may average the output of the current sensor 238 over a period of time to produce the feedback current Isense having a magnitude corresponding to an average of the inductor current $I_L$. The period of time may correspond to a period of the PWM clock RCK, but embodiments are not limited thereto.

Similarly, in some embodiments, the current sense circuit 236 may perform additional low-pass filtering of the output of the current sensor 238 to produce the feedback current Isense having a magnitude corresponding to a filtered value of the inductor current $I_L$. A cutoff frequency used to filter the output of the current sensor 238 may be substantially less than a frequency of the PWM clock RCK.

The ramp generator circuit 228 produces the ramp signal Vramp based on the PWM clock RCK and feedback current Isense, as will be described below with reference to FIG. 3.

FIG. 3 illustrate ramp generator circuit 328 according to an embodiment. The ramp generator circuit 328 may be included in the ramp generator circuit 228 of FIG. 2. The ramp generator circuit receives the feedback current Isense according to the inductor current $I_L$ and the PWM clock RCK, and produces the ramp signal Vramp according to the received signals.

The ramp generator circuit 328 includes a monostable multivibrator (one-shot) 342, a switch 344, a current source 346, and a ramp capacitor 348. The current source 346 may be a constant current source and may in an illustrative embodiment may source 10 microamps of current, but embodiments are not limited thereto. The current source 346, the ramp signal Vramp, the feedback current Isense, the switch 344, and the ramp capacitor 348 are all coupled to an output node N.

In the embodiment shown in FIG. 3, the switch 344 is an nMOSFET, but embodiments are not limited thereto.

The operation of a ramp generator circuit 328 according to a first embodiment will be explained with reference to the SMPS 204 of FIG. 2 and the waveforms shown in FIG. 4A.

At a start time t0, the PWM clock RCK is asserted, causing the one-shot 342 to assert the ramp reset signal RReset for a predetermined interval Treset. The interval Treset may provide sufficient time to fully discharge the ramp capacitor 348 through the switch 344.

At the same time, in response to the assertion of the PWM clock RCK, the pre-driver 220 asserts the PWM signal SW, which turns off the low switch 214, and turns on the high switch 212 to allow current to flow from the power source 202 into the inductor 216 and the load 206. This causes energy to be stored in the inductor 216.

As a result of the ramp reset signal RReset being asserted, the switch 344 turns on, discharging the ramp capacitor 348 and clamping the ramp signal Vramp to ground.

After the interval Treset has passed after the assertion of the ramp reset signal RReset, the one-shot 342 de-asserts the ramp reset signal RReset, turning the switch 344 off. As a result, the ramp signal Vramp ceases being clamped to ground.

Because the ramp signal Vramp is no longer clamped to ground, the ramp capacitor 348 charges so that a voltage thereof rises at a rate determined by a capacitance C of the ramp capacitor 348 and a charging current corresponding to a net current at a node from which the ramp signal Vramp is produced. The ramp signal Vramp feeds a very-high-impedance load, and accordingly the charging current is determined by the reference current Iref sourced by the current source 346 and the current provided by the feedback current Isense. As a result, the voltage of the ramp signal Vramp increases at a rate R given by:

$$R = (Iref + Isense)/C \quad \text{Equation 2A}$$

so that the slope increases as the inductor current $I_L$ increases, and for the specific illustrative case where the value of the feedback current Isense is essentially constant over an interval from the start time t0 and a next start time t0', the ramp signal Vramp has a voltage given by:

$$Vramp = (t - (t0 + Treset)) * (Iref + Isense)/C \quad \text{Equation 3A}$$

where t is a time between the start time t0 and the next start time t0'. For the more general case where the inductor current $I_L$ and therefore the feedback current Isense varies in the interval from the start time t0 and a next start time t0', the ramp signal Vramp has a voltage given by:

$$Vramp(t) = \int_{x=t0+Treset}^{t} \frac{Iref + Isense(x)}{C} \quad \text{Equation 3B}$$

where Isense(x) is the value of the feedback current Isense at time x and Vramp(t) is a value of the ramp signal Vramp at time x.

At the switch time t1, the voltage of the ramp signal Vramp becomes equal to or great than the error signal Verror. As a result, the first comparator 222 asserts the phase control signal PC.

In response to the assertion of the phase control signal PC, shortly after the switch time t1, the pre-driver 220 de-asserts the PWM signal SW, which turns off the high switch 212, and turns on the low switch 214 to allow current generated from the energy stored in the inductor 216 to flow into the load 206.

Accordingly, the duration Dch of the charging phase of the SMPS 204, corresponding to the interval between the start time t0 and the switch time t1, during which interval energy is stored in the inductor 216, is determined by:

$$Dch = (t1 - (t0 - Treset)) = \frac{Verror}{(Iref + Isense)/C} \quad \text{Equation 4A}$$

As can be seen from Equation 4A, the duration Dch of the charging phase increases as the error signal Verror increases (i.e., as the output voltage Vout decreases), and decreases as the magnitude of the feedback current Isense increases (that is, as the inductor current $I_L$ during the charging phase increases.)

The events described above then repeat starting at the next start time t0'.

The operation of a ramp generator circuit 328 according to a second embodiment will be explained with reference to the SMPS 204 of FIG. 2 and the waveforms shown in FIG. 4B. The operation of the ramp generator circuit 328 differs because of differences in the other components of the SMPS 204.

Specifically, in the second embodiment, the error signal Verror is produces by subtracting the scaled output voltage Vout from the reference voltage Vref:

$$Verror = (Vout/S) - Vref. \quad \text{Equation 1B}$$

and accordingly the error signal Verror increases when the output voltage Vout decreases.

Also, in the second embodiment, the feedback current Isense is sunk instead of sourced, so that the voltage of the ramp signal Vramp increases at a rate R given by:

$$R = (Iref - Isense)/C \quad \text{Equation 2B}$$

so that the slope decreases as the inductor current $I_L$ increases. Accordingly, the ramp signal Vramp has a voltage given by:

$$Vramp(t) = \int_{x=t0+Treset}^{t} \frac{Iref + Isense(x)}{C} \quad \text{Equation 3C}$$

For the final difference, in the second embodiment, the pre-driver circuit 220 begins a charging interval during which the inductor 216 is charged by asserting the PWM signal SW in response to the assertion of the phase control signal PC that indicates that the error signal Verror is greater than the ramp signal Vramp, and ends the charging interval by de-asserting the PWM signal SW in response to the assertion of the PWM clock RCK.

That is, at a start time t0b, the PWM clock RCK is asserted, causing the one-shot 342 to assert the ramp reset signal RReset for a predetermined interval Treset. The interval Treset may provide sufficient time to fully discharge the ramp capacitor 348 through the switch 344.

At the same time, in response to the assertion of the PWM clock RCK, the pre-driver 220 de-asserts the PWM signal SW, which turns on the low switch 214, and turns off the high switch 212 to allow current generated from energy stored in the inductor 216 to flow into the load 206.

As a result of the ramp reset signal RReset being asserted, the switch 344 turns on, discharging the ramp capacitor 348 and clamping the ramp signal Vramp to ground.

After the interval Treset has passed after the assertion of the ramp reset signal RReset, the one-shot 342 de-asserts the ramp reset signal RReset, turning the switch 344 off. As a result, the ramp signal Vramp ceases being clamped to ground.

Because the ramp signal Vramp is no longer clamped to ground, the ramp capacitor 348 charges so that a voltage thereof rises at a rate determined by a capacitance C of the ramp capacitor 348 and a charging current corresponding to a net current at a node from which the ramp signal Vramp is produced. The ramp signal Vramp feeds a very-high-impedance load, and accordingly the charging current is determined by the reference current Iref sourced by the current source 346 and the current sunk by the feedback current Isense. As a result, the voltage of the ramp signal Vramp increases at a rate R given in Equation 2B, above, and the ramp voltage Vramp has a voltage value according to Equation 3C, above.

At the switch time t1b, the voltage of the ramp signal Vramp becomes equal to or great than the error signal Verror. As a result, the first comparator 222 asserts the phase control signal PC.

In response to the assertion of the phase control signal PC, shortly after the switch time t1b, the pre-driver 220 asserts the PWM signal SW, which turns on the high switch 212, and turns off the low switch 214 to allow current to flow from the input voltage Vin into the inductor 216 and the load 206, which causes energy to be stored into the inductor 216.

The events described above, including the end of the charging period for the inductor 2116, repeat starting at the next start time t0b'.

Accordingly, the duration Dch of the charging phase of the SMPS 204, corresponding to the interval between the switch time t1b and the beginning of the next clock cycle at second start time t0b', during which energy is stored in the inductor 216, is determined by:

$$Dch = ((t0b + Tc) - t1b) = Tc - \frac{Verror}{(Iref - Isense)/C} \quad \text{Equation 4B}$$

wherein Tc is the cycle time of the PWM clock RCK. As can be seen from Equation 4B, the duration Dch of the charging phase increases as the error signal Verror decreases (i.e., as the output voltage Vout decreases), and decreases as the magnitude of the sunk feedback current Isense increases (that is, as the inductor current $I_L$ during the charging phase increases.)

In both embodiments of the SMPS 204 described above, the ramp generator circuit 328 controls the amplitude of the ramp signal Vramp according to the inductor current $I_L$ so that, for a given error signal Verror, a duty cycle of each embodiment of the SMPS 204 increases and decreases when the inductor current $I_L$ decreases and increases, respectively. While two embodiments are described above, embodiments are not limited thereto.

Figure 5:
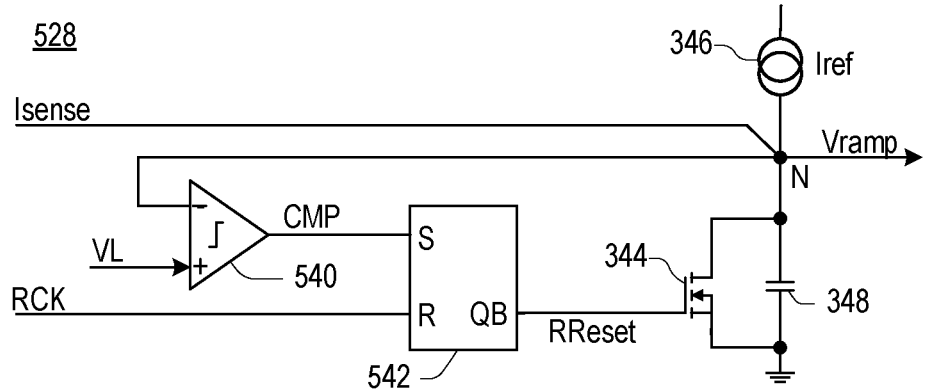
FIG. 5 illustrates a ramp generator circuit according to another embodiment.

FIG. 5 illustrate ramp generator circuit 528 according to another embodiment. The ramp generator circuit 528 may be included in the ramp generator circuit 228 of FIG. 2. The ramp generator circuit receives the feedback current Isense according to the inductor current $I_L$ and the PWM clock RCK, and produces the ramp signal Vramp according to the received signals. Unlike the ramp generator circuit 328 of FIG. 3 which generates a ramp signal Vramp have a ramp starting voltage corresponding to a ground voltage, the ramp generator circuit 528 generates a ramp signal Vramp have a ramp starting voltage corresponding to a ramp low voltage VL, which may simplify the design of circuits that receive the ramp signal Vramp.

The ramp generator circuit 528 includes a second comparator 540 and a set-reset flip-flip (SRFF) 542. The ramp generator circuit 528 also includes the switch 344, the current source 346, and the ramp capacitor 348 described with respect to FIG. 3. The current source 346, the ramp signal Vramp, the feedback current Isense, the switch 344, and the ramp capacitor 348 are all coupled to an output node N.

Figure 6:
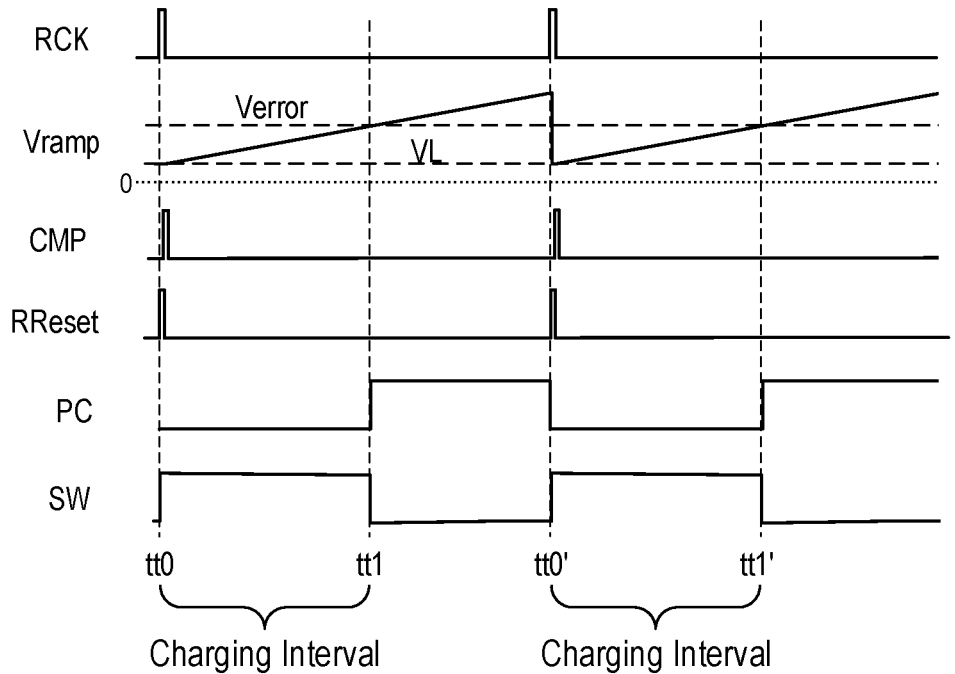
FIG. 6 includes waveforms illustrating operation of the ramp generator of FIG. 5.

The operation of the ramp generator circuit 528 will be explained with reference to the SMPS 204 of FIG. 2 and the waveforms shown in FIG. 6. In particular, the operation will be explained in accordance with the first embodiment of the SMPS 204 described with respect to FIG. 4A, above, however, embodiments are not limited thereto, and a person of skill in the art would understand that the ramp generator circuit 528 could also operate within the second embodiment of the SMPS 204 described with respect to FIG. 4B, above.

At a start time tt0, the PWM clock RCK is asserted for a brief interval (that is, for a pulse), and as a result the SRFF 342 enters a reset state, wherein the inverted output QB of the SRFF 342 asserts the ramp reset signal RReset. As a result of the ramp reset signal RReset being asserted, the switch 344 turns on, discharging the ramp capacitor 348.

At the same time, in response to the assertion of the PWM clock RCK, the pre-driver 220 asserts the PWM signal SW, which turns off the low switch 214, and turns on the high switch 212 to allow current to flow from the power source 202 into the inductor 216 and the load 206.

Shortly after the assertion of the ramp reset signal RReset, the ramp capacitor 348 discharges enough that the ramp signal Vramp drops below the ramp low voltage VL. This causes the second comparator 540 to assert the comparison signal CMP.

As a result of the assertion of the comparison signal CMP, the SRFF 342 enters a set state wherein the inverted output QB is low. This turns off the switch 344, and as a result the ramp capacitor 348 begins to charge. When the ramp signal Vramp charges to a voltage level above the ramp low voltage VL, the second comparator 540 de-asserts the comparison signal CMP.

When the switch 344 is off, the ramp capacitor 348 charges at a rate determined by a capacitance C of the ramp capacitor 348 and a charging current corresponding to a net current at a node from which the ramp signal Vramp is produced. The ramp signal Vramp feeds a very-high-impedance load, and accordingly the charging current is determined by the reference current Iref sourced by the current source 346 and the current sunk by the feedback current Isense. As a result, the ramp signal Vramp increases at a rate R given by Equation 1A, above, and the ramp signal Vramp has a voltage given by:

$$Vramp(t) = VL + \int_{x=tt0+Tdl}^{t} \frac{Iref - Isense(x)}{C} \quad \text{Equation 5}$$

where Tdl is a discharge interval required for the ramp capacitor to discharge to the ramp low voltage VL and t is a time between the start time tt0 and a next start time tt0'. In illustrative embodiments, the discharge interval Tdl is less than 1% of the period of the PWM clock RCK, but embodiments are not limited thereto.

At the switch time tt1, the voltage of the ramp signal Vramp becomes equal to or great than the error signal Verror. As a result, the first comparator 222 asserts the phase control signal PC.

In response to the assertion of the phase control signal PC, shortly after the switch time tt1, the pre-driver 220 de-asserts the PWM signal SW, which turns off the high switch 212, and turns on the low switch 214 to allow current generated from the energy stored in the inductor 216 to flow into the load 206.

Accordingly, the duration Dch of the charging phase of the SMPS 204, corresponding to the interval between the start time t0 and the switch time tt1, during which interval energy is stored in the inductor 216, is determined by:

$$Dch = (tt1 - (tt0 + tdl)) = tdL + \frac{Verror - VL}{(Iref + Isense)/C} \quad \text{Equation 6}$$

As can be seen from Equation 5, the duration Dch of the charging phase increases as the error signal Verror increases, and decreases as the magnitude of the feedback current Isense increases (that is, as the inductor current $I_L$ during the charging phase increases.)

Unlike the ramp generator circuit 328 of FIG. 3, the ramp generator circuit 528 does not use a predetermined discharge interval to discharge the ramp capacitor 348 at the beginning of each ramp cycle. Instead, the ramp generator circuit 528 uses a feedback circuit comprising the second comparator 540 to stop discharging the ramp capacitor 348 when a voltage across the ramp capacitor 348 reached a desired starting voltage level for the ramp.

Figure 7:
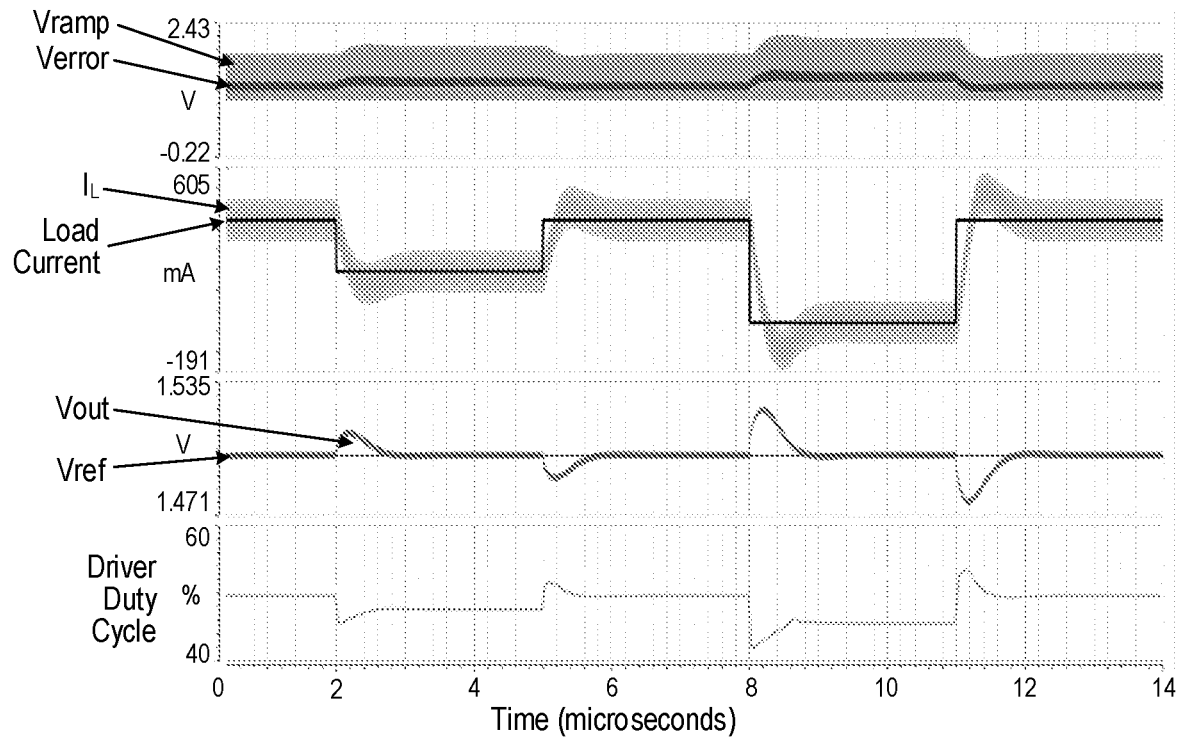
FIG. 7 includes waveforms illustrating operation of an SMPS according to the embodiment of FIG. 2.

FIG. 7 includes waveforms illustrating operation of an SMPS according to an embodiment, such as the SMPS 204 of FIG. 2. The waveforms include the ramp signal Vramp, the error signal Verror, the inductor current $I_L$, the load current, the output voltage of the SMPS, the reference voltage Vref, and the driver duty cycle of the driver 210 that controls the charging and discharging of energy in the energy storage inductor of the SMPS.

As seen in FIG. 7, variations in the load current are reflected in variations of the minimum, maximum, and average magnitude of the inductor current $I_L$ during switching cycles of the SMPS. When a change occurs in the load current, the change in the magnitudes of the inductor current $I_L$ lags the change in in the load current.

Because the embodiments described above change the charging slope of the ramp signal Vramp, and because in the above embodiment the duration of the ramp is fixed to a cycle time of the PWM clock RCK which, here, has a constant frequency, the maximum voltage reached by the ramp signal Vramp changes according to the inductor current $I_L$. Specifically, when the inductor current $I_L$ decreases, such as between 2 and 5 microseconds in FIG. 7, the maximum voltage reached by the ramp signal Vramp increases, and when the inductor current $I_L$ increases, such as between 5 and 8 microseconds in FIG. 7, the maximum voltage reached by the ramp signal Vramp decreases.

Figure 8:
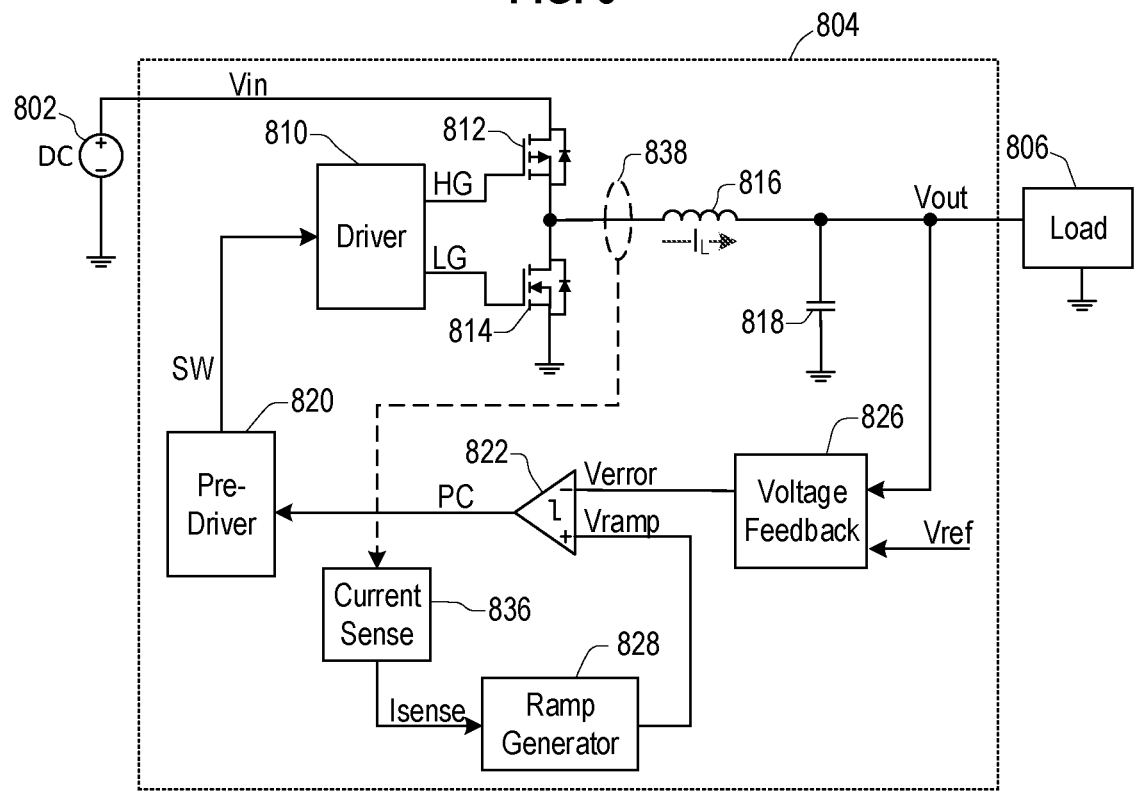
FIG. 8 illustrates an SMPS according to another embodiment.

FIG. 8 illustrates an SMPS 804 according to another embodiment. Elements 802 through 818, 822, 826, 836, and 838 of FIG. 8 respectively correspond to elements 202 through 218, 222, 226, 236, and 238 of FIG. 2, and therefore descriptions of the above-listed elements of FIG. 8 are omitted in the interest of brevity.

The SMPS 804 is a variable-frequency PWM SMPS, and does not require a PWM clock such as is generated by the PWM clock circuit 234 of FIG. 2. Because the SMPS 804 does not rely on a PWM clock, the functioning of the pre-driver circuit 820 of FIG. 8 differs from the functioning of the pre-driver circuit 220 of FIG. 2, and the functioning of the ramp generator circuit 828 differs from the functioning of the ramp generator circuit 228 of FIG. 2.

The pre-driver circuit 820 controls the PWM signal SW according to the phase control signal PC, asserting the PWM signal SW when the phase control signal PC is asserted and de-asserting the PWM signal SW when the phase control signal PC is de-asserted. Accordingly, the pre-driver circuit 820 may comprise amplifiers, level shifters, and so on. Because such pre-drivers are well-known in the art, additional description is omitted.

The ramp generator circuit 828 controls a frequency of the ramp signal Vramp according to the feedback current Isense. However, the slope of the ramp signal Vramp does not change with changes to the feedback current Isense, and accordingly, for a given error signal Verror, the duty cycle varies according to the feedback current Isense, and therefor varies based on the inductor current $I_L$ which the feedback current Isense corresponds to.

Figure 9:
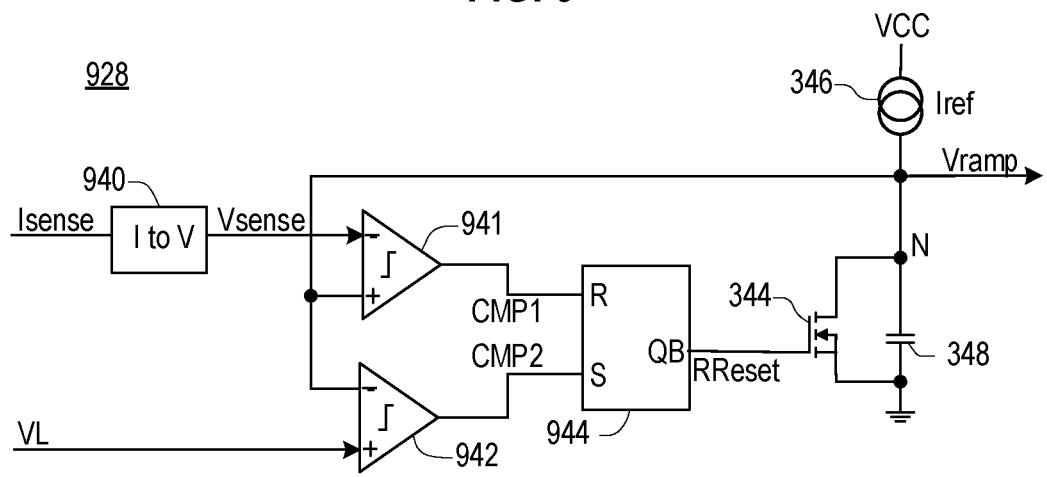
FIG. 9 illustrates a ramp generator circuit according to another embodiment.

FIG. 9 illustrate a ramp generator circuit 928 according to another embodiment. The ramp generator circuit 928 may correspond to the ramp generator circuit 828 of FIG. 8.

The ramp generator circuit 928 includes a current-to-voltage (I2V) converter 940, first and second comparators 941 and 942, and a set-reset flip-flip (SRFF) 944. The ramp generator circuit 928 also includes the switch 344, the current source 346, and the ramp capacitor 348 described with respect to FIG. 3.

The I2V converter 940 receives the feedback current Isense and produces a feedback voltage Vsense having a voltage value corresponding to a current value of the feedback current Isense. The feedback voltage Vsense decreases in response to an increase in the magnitude of the feedback current Isense and decreases in response to an increase in the magnitude of the feedback current Isense, and may include a predetermined offset voltage Voffset.

Accordingly, in embodiments, the value of the feedback voltage Vsense may correspond to:

$$Vsense = Voffset - k \times |Isense| \qquad \text{Equation 7}$$

wherein k is a predetermined scaling factor and Voffset corresponding to the maximum voltage of the ramp signal Vramp. However, embodiments are not limited to a linear relationship between the feedback current Isense and the feedback voltage Vsense such as is embodied in Equation 6.

The second comparator 941 compares the voltage value of the feedback voltage Vsense to a voltage value of the ramp signal Vramp, asserts a first compare signal CMP1 when the ramp signal Vramp is greater than the feedback voltage Vsense, and de-asserts the first compare signal CMP1 when the ramp signal Vramp is less than the feedback voltage Vsense. A person of ordinary skill in the related arts would understand that various embodiments of the second comparator 941 may either assert or de-assert the first compare signal CMP1 when the ramp signal Vramp is equal to the feedback voltage Vsense, or may have built-in hysteresis.

The third comparator 942 compares the ramp low voltage VL to the voltage value of the ramp signal Vramp, asserts a second compare signal CMP2 when the ramp signal Vramp is less than the ramp low voltage VL, and de-asserts the second compare signal CMP2 when ramp signal Vramp is greater than the ramp low voltage VL. A person of ordinary skill in the related arts would understand that various embodiments of the second comparator 941 may either assert or de-assert the first compare signal CMP1 when the ramp signal Vramp is equal to the feedback voltage Vsense, or may have built-in hysteresis.

The SRFF 944 is reset in response to the first compare signal CMP1 being asserted, and is set in response to the second compare signal CMP2 being asserted. Accordingly, the ramp reset signal RReset produced at the inverted output QB of the SRFF 944 is asserted in response to the first compare signal CMP1 being asserted, and de-asserted in response to the second compare signal CMP2 being asserted.

The switch 344 is controlled by the ramp reset signal RReset, as described with respect to FIG. 3.

Figure 10:
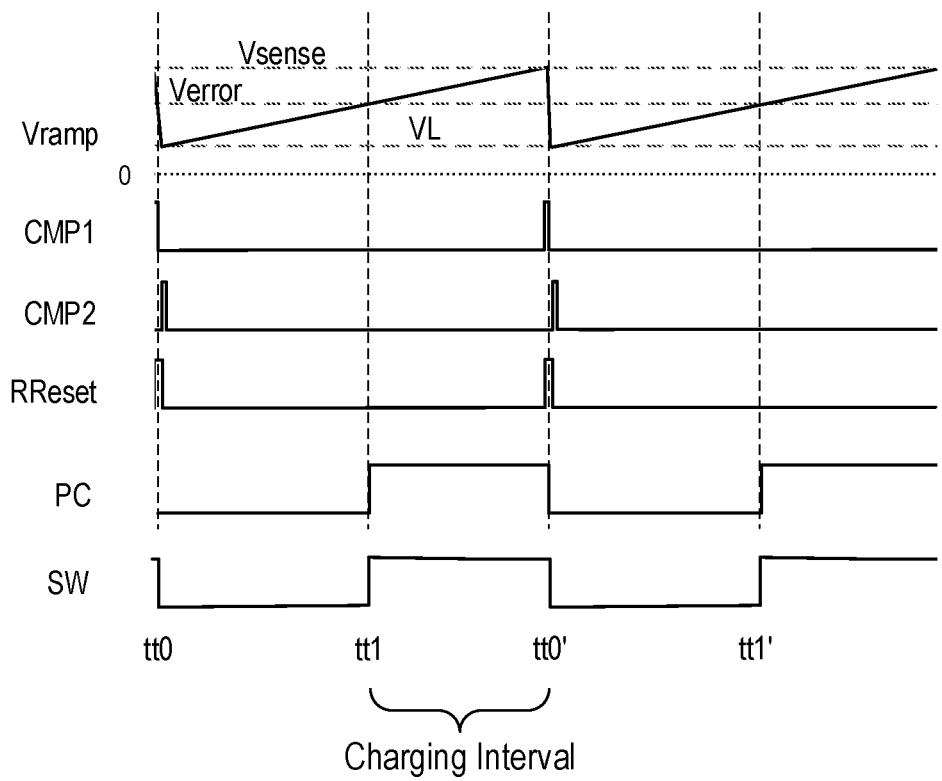
FIG. 10 includes waveforms illustrating operation of the ramp generator of FIG. 9.

FIG. 10 includes waveforms illustrating operation of the ramp generator circuit 928 of FIG. 8. In the example of FIG. 10, the first compare signal CMP1 is asserted before an initial start time tt0, causing the ramp reset signal RReset to be asserted, which turns on the switch 344.

The switch 344 being on causes the ramp capacitor 346 to discharge which causes the voltage value of the ramp signal Vramp to decrease.

When the voltage value of the ramp signal Vramp drops below the feedback voltage Vsense, the second comparator 941 de-asserts the first compare signal CMP1.

When the voltage value of the ramp signal Vramp drops below the voltage value of the error signal Verror, the first comparator 822 of FIG. 8 de-asserts the phase control signal PC, which causes the PWM signal SW to be de-asserted, and as a result the high switch 812 turns off and the low switch 814 turns on, allowing the energy stored in the inductor 816 to provide a current to the load 806.

When the voltage value of the ramp signal Vramp drops below the ramp low voltage VL, the second compare signal CMP2 is asserted, causing the ramp reset signal RReset to be de-asserted, which turns off the switch 344.

The switch 344 being off allows the reference current Iref to charge the ramp capacitor 346, which causes the voltage value of the ramp signal Vramp to increase.

At a first time tt1, the ramp signal Vramp reaches and then exceeds the error signal Verror. In response, the first comparator 822 of FIG. 8 asserts the phase control signal PC, which causes the PWM signal SW to be asserted, and as a result the high switch 812 turns on and the low switch 814 turns off, allowing a current to flow from the input voltage Vin to the inductor 816 and the load 806, which stores energy into the inductor 816, thus starting a charging interval.

Subsequently, at a next start time tt0', the voltage value of the ramp signal Vramp becomes greater than the feedback voltage Vsense, causing the second comparator 941 to assert the first compare signal CMP1, which causes the sequence of events described above starting at the start time tt0 to repeat, ending the charging interval.

As can be seen in FIG. 10, in the ramp generator circuit 928, the slope of the ramp signal Vramp depends only on the reference current Iref and the capacitance of the ramp capacitor 348, and the on-time of the phase control signal PC is determined by the slope of the ramp signal Vramp and the error signal Verror. However, the cycle time (and therefore the frequency) of the ramp signal Vramp is determined by the feedback current Isense, and accordingly, the duty cycle of the phase control signal PC varies according to both the error signal Verror and the feedback current Isense.

Specifically, the voltage of the ramp signal Vramp increases at a rate R given by:

$$R = Iref/C \qquad \text{Equation 8}$$

where C is the capacitance of the ramp capacitor 348. The interval between the start time tt0 and the first time tt1, during which interval current flows into the inductor 816, is given by $$Tc - (tt1 - tt0) = Tc - (Verror - VL)/R. \qquad \text{Equation 9}$$

where Tc is the cycle time Tc of the ramp signal Vramp. Considering Equation 6, above, the cycle time Tc of the ramp signal Vramp is given by $$Tc = \frac{Vsense - VL}{R} = \frac{Voffset - k \times |Isense| - VL}{R} = \frac{Vrr - k \times |Isense|}{R} \quad \text{Equation 10}$$

wherein Vsense is a voltage value of the feedback voltage Vsense and Vrr, the ramp range voltage, is the difference between the ramp low voltage VL and a maximum value (Voffset) of the feedback voltage Vsense, and corresponds to a maximum amplitude (Voffset–VL) of the ramp signal Vramp. Accordingly, a duty cycle DC of the SMPS 804 is equal to:

$$DC = \frac{Tc - (tt1 - tt0)}{Tc} = 1 - \frac{Verror - VL}{Vrr - k \times |Isense|} \quad \text{Equation 11}$$

As can be seen from Equation 11, the duty cycle DC of the SMPS 804 (i.e., of the PWM signal SW) increases as the error signal Verror increases, but decreases as the feedback voltage Vsense corresponding to the inductor current $I_L$ increases. On the other hand, the frequency of the PWM signal SW, being the inverse of the cycle time Tc determined according to Equation 10, increases when the sense current Isense corresponding to the inductor current $I_L$ increases, and decreases when the sense current Isense decreases.

Figure 11:
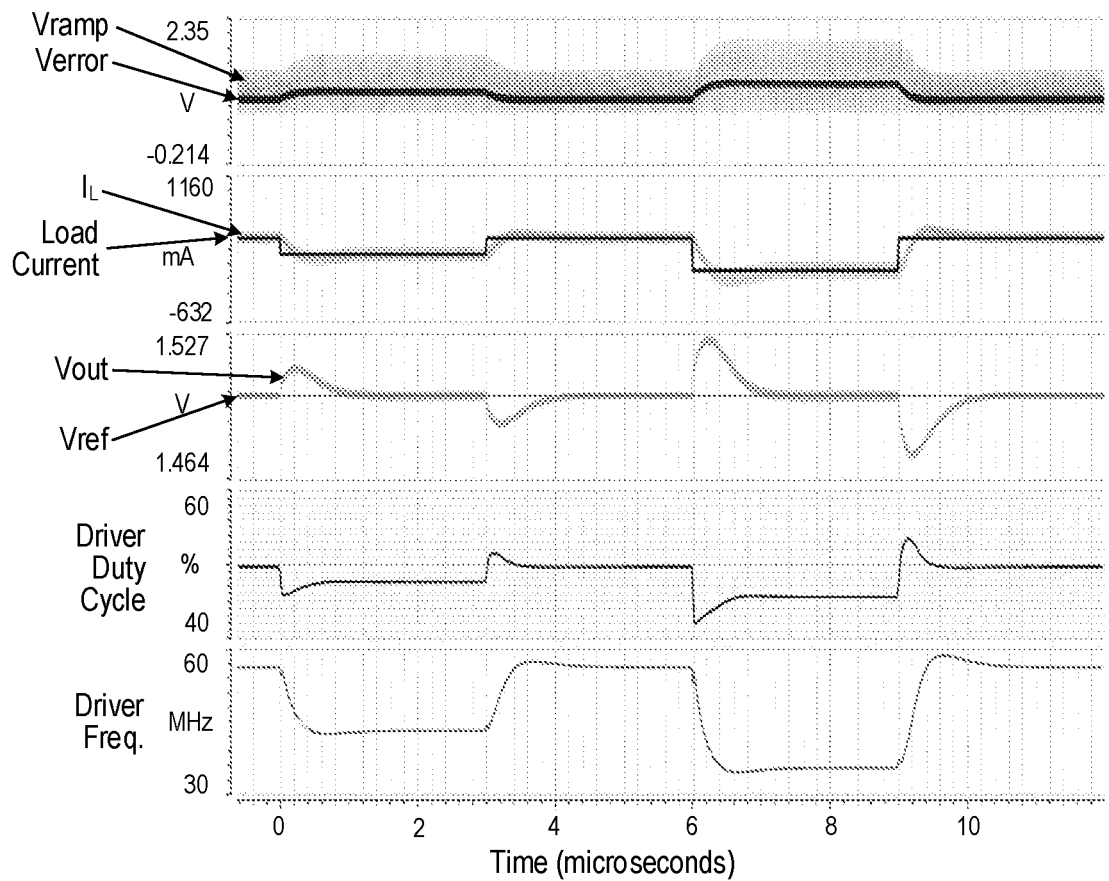
FIG. 11 includes waveforms illustrating operation of an SMPS according to the embodiment of FIG. 8.

FIG. 11 includes waveforms illustrating operation of an SMPS according to an embodiment, such as the SMPS 804 of FIG. 8. The waveforms include the ramp signal Vramp, the error signal Verror, the inductor current $I_L$, the load current, the output voltage of the SMPS, the reference voltage Vref, the duty cycle of the PWM signal SW provided to the driver circuit 810 that controls the charging and discharging of energy in the energy storage inductor of the SMPS, and the frequency of the PWM signal SW.

As seen in FIG. 11, variations in the load current are reflected in variations of the minimum, maximum, and average magnitude of the inductor current $I_L$ during switching cycles of the SMPS. When a change occurs in the load current, the change in the magnitudes of the inductor current $I_L$ lags the change in in the load current.

Because embodiments change the cycle time (and therefore the frequency) of the ramp signal Vramp, and because in the illustrated embodiment the slope of the ramp signal Vramp is fixed, the maximum voltage reached by the ramp signal Vramp changes according to the inductor current $I_L$. Specifically, when the inductor current $I_L$ decreases, such as between 0 and 3 microseconds in FIG. 11, the maximum voltage reached by the ramp signal Vramp increases, and the cycle time increases so that the driver frequency (corresponding to the frequency of the ramp signal Vramp) decreases. When the inductor current $I_L$ increases, such as between 3 and 6 microseconds, the cycle time and the maximum voltage reached by the ramp signal Vramp decrease and the driver frequency (corresponding to the frequency of the ramp signal Vramp) increase.

Figure 12:
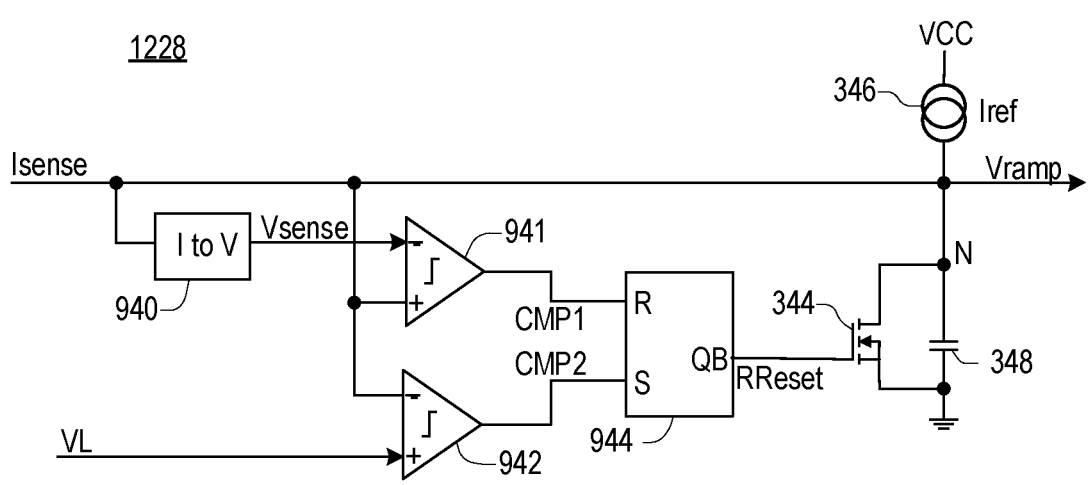
FIG. 12 illustrate a ramp generator circuit according to another embodiment.

FIG. 12 illustrate a ramp generator circuit 1228 according to another embodiment. The ramp generator circuit 928 may correspond to the ramp generator circuit 828 of FIG. 8.

The ramp generator circuit 1228 includes a current-to-voltage (I2V) converter 940, first and second comparators 941 and 942, and a set-reset flip-flip (SRFF) 944 described with respect to FIG. 9. The ramp generator circuit 928 also includes the switch 344, the current source 346, and the ramp capacitor 348 described with respect to FIG. 3.

Because the operation of these elements is as described with reference to FIGS. 9 and 3, further description is omitted in the interest of brevity.

The ramp generator circuit 1228 differs from the ramp generator circuit 928 in that the feedback current Isense controls not only the limit on the maximum value of the ramp signal Vramp, as in the ramp generator circuit 928, but also the rate R at which the ramp signal Vramp increase.

Specifically, the voltage of the ramp signal Vramp increases at a rate R given by:

$$R = (Iref + Isense)/C \quad \text{Equation 12}$$

where C is the capacitance of the ramp capacitor 348. A cycle time Tc of the ramp signal Vramp is given by $$Tc = \frac{Vsense - VL}{R} = \frac{Voffset - k \times Isense - VL}{R} = \frac{Vrr - k \times Isense}{R}$$

$$= C \times \frac{Vrr - k \times Isense}{Iref + Isense} \quad \text{Equation 13}$$

As can be seen from Equation 13, the duty cycle DC of the SMPS 804 (i.e., of the PWM signal SW) increases as the error signal Verror increases, but decreases as the feedback voltage Vsense corresponding to the inductor current $I_L$ increases. On the other hand, the frequency of the of the PWM signal SW, being the inverse of the cycle time Tc determined according to Equation 10, increases when the sense current Isense corresponding to the inductor current $I_L$ decreases and decreases when the sense current Isense increases.

As can be seen by comparing FIGS. 3, 5, 9, and 12 to the related arts, embodiments of this invention reduce or prevent subharmonic oscillation in an SMPS with simpler circuitry than previously-known solutions.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

The invention claimed is:

1. A Switched-Mode Power Supply (SMPS), comprising:
   an energy storage device;
   a current sense circuit configured to produce a feedback current according to a current flowing through the energy storage device; and
   a ramp generator circuit configured to produce a ramp signal according to the feedback current,
   wherein the SMPS is configured to control a duty cycle of the current flowing through the energy storage device using the ramp signal,
   wherein an increase in a magnitude of the feedback current causes a decrease in the duty cycle,
   wherein a decrease in the magnitude of the feedback current causes an increase in the duty cycle, and
   wherein the ramp generator circuit comprises:
     a reference current source;
     an output node configured to:
       receive an output of the reference current source and the feedback current, and produce a charging current according to a sum of the output of the reference current source and the feedback current;
a ramp capacitor coupled to the output node; and
a discharge circuit coupled across the ramp capacitor and receiving a clock signal, the discharge circuit configured to discharge the ramp capacitor in response to the clock signal,
wherein the ramp capacitor is charged according to the charging current, and
wherein the ramp signal is produced at the output node.

2. The SMPS of claim 1,
wherein the generator circuit is configured to control an amplitude of the ramp signal according to the feedback current, the amplitude being a difference between the highest value and lowest value of the ramp signal during a cycle.

3. The SMPS of claim 1, wherein a rate of increase of the ramp signal varies according to the magnitude of the feedback current.

4. The SMPS of claim 1, wherein the discharge circuit comprises:
a discharge switch coupled across the ramp capacitor; and
a one-shot circuit controlling the discharge switch according to the clock signal,
wherein the one-shot circuit turns the switch on for a preset interval in response to an edge of the clock signal.

5. The SMPS of claim 1, wherein the discharge circuit comprises:
a discharge switch coupled across the ramp capacitor; and
a comparator circuit to output a comparison signal according to a comparison of s voltage of the ramp signal to a ramp low voltage; and
a control circuit configured to:
turn the discharge switch on in response to an edge of the clock signal, and
turn the discharge switch off in response to the comparator signal indicating that the voltage of the ramp signal is less than or equal to the ramp low voltage.

6. The SMPS of claim 1, wherein the ramp generator is configured to control a cycle time of the ramp signal according to a magnitude of the feedback current.

7. A Switched-Mode Power Supply (SMPS), comprising:
an energy storage device;
a current sense circuit configured to produce a feedback current according to a current flowing through the energy storage device; and
a ramp generator circuit configured to produce a ramp signal according to the feedback current,
wherein the SMPS is configured to control a duty cycle of the current flowing through the energy storage device using the ramp signal,
wherein an increase in a magnitude of the feedback current causes a decrease in the duty cycle,
wherein a decrease in the magnitude of the feedback current causes an increase in the duty cycle, and
wherein the ramp generator circuit comprises:
a current-to-voltage converter configured to produce a feedback voltage according to the feedback current;
a reference current source producing a reference current;
a ramp capacitor configured to be charged according to the reference current; and
a discharge circuit coupled across the ramp capacitor and receiving the feedback voltage, the discharge circuit configured to discharge the ramp capacitor in response to the ramp signal being greater than the feedback voltage;
wherein the ramp signal is produced at an output node coupled between the reference current source and the capacitor.

8. The SMPS of claim 7, wherein the discharge circuit comprises:
a discharge switch coupled across the ramp capacitor;
a control circuit configured to:
turn the discharge switch on in response to the ramp signal being less than or equal to a predetermined ramp low voltage, and
turn the discharge switch off in response to the ramp signal being greater than or equal to the feedback voltage.

9. The SMPS of claim 1, wherein the energy storage device is an inductor.

10. A method of controlling a Switched-Mode Power Supply (SMPS), the method comprising:
producing a feedback current corresponding to a current flowing through an energy storage device of the SMPS;
producing a ramp signal having an amplitude corresponding to the feedback current, the amplitude being a difference between the highest value and lowest value of the ramp signal during a cycle; and
controlling a duty cycle of a power switch using the ramp signal,
wherein a power source of the SMPS provides a current to the energy storage device and to a load connected to an output of the SMPS when the power switch is on, and
wherein the energy storage device provides the current to the load when the power switch is off,
wherein an increase in a magnitude of the feedback current causes a decrease in the duty cycle,
wherein a decrease in the magnitude of the feedback current causes an increase in the duty cycle, and
wherein producing the ramp signal comprises:
producing a reference current having a predetermined value;
producing a charging current having a magnitude corresponding to subtracting the magnitude of the feedback current from the reference current; and
producing the ramp signal by charging a ramp capacitor using the charging current and discharging the ramp capacitor at the beginning of each cycle of a clock signal of the SMPS.

11. The method of claim 10, wherein producing the ramp signal comprises:
decreasing the slope of the ramp signal when the feedback current increases, and
increasing the slope of the ramp signal when the feedback current decreases.

12. The method of claim 10, wherein discharging the ramp capacitor at the beginning of each cycle of the clock signal comprises turning on a discharge switch coupled across the ramp capacitor for a preset interval in response to an edge of the clock signal.

13. The method of claim 10, wherein discharging the ramp capacitor at the beginning of each cycle of the clock signal comprises:
turning on a discharge switch coupled across the ramp capacitor in response to an edge of the clock signal, and
turning off the discharge switch in response to the ramp signal being less than or equal to a preset ramp low voltage.

14. The method of claim 10, wherein producing the ramp signal comprises controlling a cycle time of the ramp signal according to the feedback current.

15. The method of claim 10, wherein controlling the duty cycle of the power switch using the ramp signal comprises:
   determining an error signal having a voltage corresponding to a difference between an output voltage provided by the SMPS to the load and a reference voltage;
   comparing the error signal to the ramp signal to produce a phase control signal;
   controlling the duty cycle of the power switch using the phase control signal.

\* \* \* \* \*